United States Patent [19]
Zocca

[11] Patent Number: 6,049,406
[45] Date of Patent: Apr. 11, 2000

[54] SCANNER

[75] Inventor: Rinaldo Zocca, Bologna, Italy

[73] Assignee: Datalogic S.p.A., Lippo di Calderara di Reno, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,244

[22] Filed: Jan. 27, 1997

[30] Foreign Application Priority Data

Jan. 27, 1996 [DE] Germany ............................ 196 03 010

[51] Int. Cl.[7] .................................................. G02B 26/08
[52] U.S. Cl. .......................... 359/196; 359/197; 359/205; 359/208; 359/210; 359/212; 359/216; 359/900; 235/462; 235/463; 235/470
[58] Field of Search .................................... 359/205, 209, 359/210, 211, 212, 208, 216–219, 319, 900, 196–197; 235/462, 470, 463; 358/296; 250/234–236, 201.2, 201.4

[56] References Cited

U.S. PATENT DOCUMENTS 4,783,155  11/1988  Imataki et al. .
4,920,255   4/1990  Gabeler .
5,359,434  10/1994  Nakao et al. ........................... 358/296
5,426,288   6/1995  Obata et al. .

FOREIGN PATENT DOCUMENTS 0494647    7/1992  European Pat. Off. .
58-085415  8/1983  Japan .
61-053603  7/1986  Japan .
6-167646   6/1994  Japan .

*Primary Examiner*—James Phan
*Attorney, Agent, or Firm*—Sughrue, Mion, Zinn, Macpeak & Seas, PLLC

[57] ABSTRACT

A scanner for the acquisition of optical information, in particular bar codes, is proposed, which has a laser device (3), a receiving device (23), which detects laser light (25) reflected from the surface, carrying the optical information, of the object (13), and a measuring device (27), which emits a control signal corresponding to the distance from the object (13). The scanner (1) is distinguished by the fact that the laser device (3) has a single laser light source (37), and that a focusing device (31) is provided which can receive the control signal of the measuring device (27) and enables the scanner (1) to be adapted to the distance from the object (13), on the surface of which the optical information or the bar code (15) is present.

12 Claims, 3 Drawing Sheets

SCANNER

BACKGROUND OF THE INVENTION

The invention relates to a scanner for the acquisition of optical information, in particular of bar codes, having a laser device, a receiving device which detects laser light reflected from the surface, carrying the optical information of an object, and a measuring device, which registers the distance from the surface, carrying the optical information of the object, and emits a control signal corresponding to the distance.

Scanners of this type are known. They are used to identify objects which are provided with optical information. Only scanners having a laser device whose light beam is guided over the surface to be scanned by means of a suitable deflection device, in particular by means of a polygonal mirror, are discussed here. The scanners discussed here are used, in particular, to scan surfaces which are arranged at a greatly varying distance from the deflection device, for example in a distant range which varies by approximately 1 m. The depth of field of the reading range of an individual laser extends over a range of approximately 30 cm to 40 cm. If it is thus desired to cover a reading range of about 1 m with a scanner of the type discussed here, the laser device must comprise three laser light sources which each have a depth of field range of approximately 30 cm and are coordinated such that the reading or depth of field ranges supplement one another and thus provide a total distance range of about 1 m. In this case, for example, the first laser light source covers the first reading or scanning range from 0 cm to 40 cm, the second laser light source covers the second scanning region from 30 cm to 70 cm and the third laser light source covers the third scanning range from 60 cm to 100 cm. In practice, it has proved worthwhile for the ranges of the individual laser light sources to overlap somewhat, in order that an error-free signal is achieved as far as possible in all cases.

Scanners of the type discussed here are known whose deflection device has a polygonal mirror whose adjacent reflecting surfaces are each assigned to a specific laser light source, that is to say the scanner is controlled in such a way that the reflecting surface assigned to a laser is always exposed only to the laser light thereof. If an object is to be scanned in a specific reading or distance range, it is necessary to wait until, on the one hand, the laser light source assigned to this distance range is activated and the reflecting surface assigned to this light source is arranged in such a way that the laser light beam can be guided over the surface of the object to be scanned. Even with a very rapid succession of reflecting surfaces and a fast changeover of the laser light sources, waiting times arise until it is possible to scan an object at a specific distance from the corresponding laser light source. The effect of this is that the objects to be scanned can be guided past the scanner only at a restricted speed. This is disadvantageous particularly for the automatic scanning of objects, since the operating speed depends on the speed at which they are conveyed.

In order to eliminate this deficiency, it has been proposed to equip a scanner of the type described here, whose laser device has two or more laser light sources, with a measuring device which measures the distance from the object to be scanned and emits a corresponding control signal. With the aid of this control signal, the detection of the object is immediately followed by the activation of the laser which is suitable for the distance of the object. It is additionally provided that the light from all the laser light sources can be incident on any desired reflecting surface of the deflection device equipped with a polygonal mirror.

Scanners of this type manifest the disadvantage that a plurality of laser light sources must be provided for the purpose of acquiring optical information on objects situated in a distance range which is greater than the depth of field range of a laser. A scanner of this type is therefore relatively expensive and occupies a great deal of space, which often makes the structure of automatic acquisition systems considerably more expensive.

SUMMARY OF THE INVENTION

The object of the invention, therefore, is to provide a scanner for the acquisition of optical information, in particular of bar codes, which can be used to scan objects situated in a reading or distance range which is essentially greater than the depth of field range of a laser light source, and which scanner has a small structure.

This object is achieved, by a scanner for the acquisition of optical information, in particular bar codes, having a laser device, a receiving device, which detects laser light reflected from the surface, carrying the optical information of the object and emits a control signal corresponding to the distance, characterized in that the laser device has a single laser light source and in that a focusing device is provided which can receive the control signal of the measuring device and effects adaptation of the scanner to the distance from the object. By virtue of the fact that the scanner has a focusing device which can receive the control signal of a measuring device and enables the scanner to be adapted to the distance from the scanned surface of an object, the laser device of the scanner can be equipped with a single laser light source. A scanner of this type therefore has a relatively small structure, although the range within which the surface of objects can be scanned is essentially greater than the depth of field range of the laser light source. The distance range is, in particular, greater than the depth of field range of a laser light source which does not have a focusing device of this type.

An embodiment of the scanner in which the focusing device has mechanical actuating means is particularly preferred. A focusing device of this type is distinguished by the fact that it occupies particularly little space, responds quickly to the control signal of the measuring device and can be realized at relatively little expense.

A scanner is preferred, moreover, whose focusing device has a piezoelectric element which serves as mechanical actuating means. Piezoelectric crystals are particularly small and can thus respond very quickly to control signals. The mass inertia of focusing devices of this type is very low.

BRIEF DESCRIPTION OF THE DRAWINGS

The invention is explained in more detail below with reference to the drawing, in which.

DETAILED DESCRIPTION OF THE INVENTION

Figure 1:
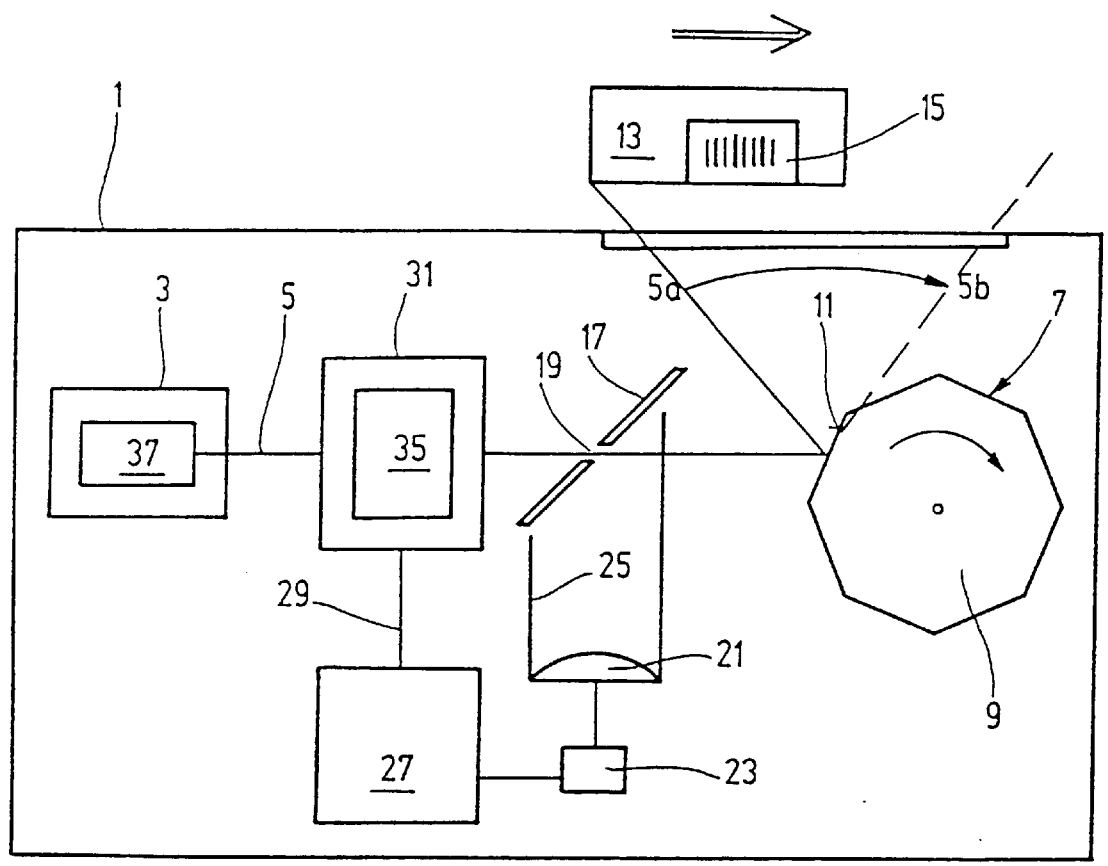
FIG. 1 shows a schematic sketch of a scanner.

The illustration in Figure is shows a scanner 1 having a laser device 3 from which a laser light beam 5 emerges and impinges on a deflection device 7, which in this case has a rotating polygonal mirror 9. The laser light beam 5 is deflected by a reflecting surface 11. When the polygonal mirror 9 undergoes a rotary movement in the clockwise direction, a light beam reflected by the reflecting surface 11 is likewise pivoted in the clockwise direction, this being indicated by a light beam 5*a* represented by an unbroken line and a light beam 5*b* represented by a dashed line. The laser light beam 5 is directed onto an object 13 to be registered, on which optical information is provided, for example in the form of a bar code 15.

The light reflected from the bar code falls onto the reflecting surface 11 and is reflected by the latter onto a deflection mirror 17, which has an opening 19 for the light emerging from the laser device 3. The light reflected from the surface of the object 13 is directed directly from the deflection mirror 17, via an optical system having a lens 21, onto a receiving device 23, which converts the optical signals into an electrical signal. This signal is processed in a measuring device 27, which registers the distance existing between the scanner 1 and the object 13 to be scanned and emits a control signal via a line 29 to a focusing device 31.

The focusing device 31 has a mechanical actuator 35 which influences the focusing of the laser light beam 5.

The scanner 1 is distinguished by the fact that the laser device 3 has only a single laser light source 37. This fact means that the laser can have a very compact and space-saving construction.

The following is to be emphasized regarding the function of the scanner 1:

A laser light beam 5 is emitted by the laser device 3 or by the laser light source 37 for the purpose of acquiring optical information on objects 13, in particular bar codes 15. The laser light beam 5 is guided via the focusing device 31 and through the opening 19 in the deflection mirror 17 as far as the reflecting surface 11 of the deflection device 7. On account of the rotary movement of the polygonal mirror 9, the beam reflected by the reflecting surface 11 sweeps over the surface of the object 13 to be scanned, and thus over the bar code 15 as well. The light reflected from the surface of the object 13 passes via the reflecting surface 11 and the deflection mirror 17, via the lens 21, to the receiving device 23 and to the measuring device 27, which registers the distance between the scanner 1 and the object 13. The focusing device 31 is adjusted by means of a control signal on the line 29 in such a way that the light reflected from the object 13 is imaged sharply on the receiving device 23.

The focusing device 31 is distinguished by the fact that the actuator 35 is of mechanical construction and can therefore react very rapidly to the control signal of the measuring device 27.

Figure 2:
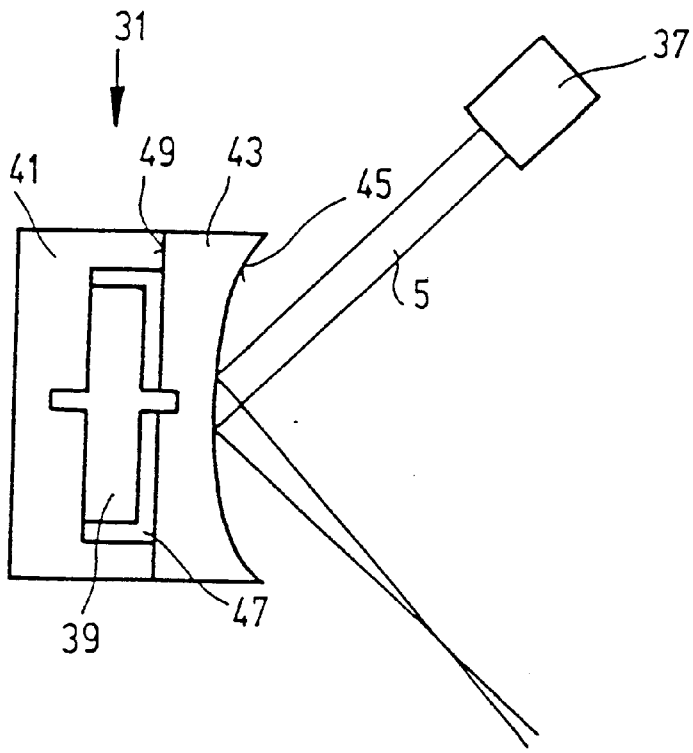
FIG. 2 shows a schematic sketch of a first exemplary embodiment of a focusing device of a scanner.

FIG. 2 shows a first embodiment of the focusing device 31, which is equipped with a piezoelectric element 39. The piezoelectric element is connected fixedly to an immobile bearing 41, on the one hand, and to a reflection element 43, on the other hand. The reflection element exhibits a reflective, curved surface 45 on which the laser light beam 5 emerging from the laser light source 37 impinges. The laser light beam 5 is focused by the curved surface 45, the distance of the focusing point depending on the curvature of the surface 45.

The reflection element 43 is designed in such a way that when the piezoelectric element 39 undergoes a dimension change, the distance between the reflection element and the immobile bearing 41 is varied, thereby changing the radius of curvature of the surface 45.

In the exemplary embodiment illustrated here, the piezoelectric element 39 is arranged in a recess 47 in the bearing 41 and is fixedly anchored on the bottom of the recess 47. If a control voltage, which is generated by the measuring device 27, is applied to the piezoelectric element 39, then the dimensions of the piezoelectric element 39 change. That surface of the piezoelectric crystal which is opposite to the bottom of the recess 47 changes its distance from the bottom. The reflection element 43 is fixed on the said side of the piezoelectric crystal which is opposite to the bottom of the recess 47, which reflection element 43 rests on a bearing surface 49 which surrounds the recess 47 at least in regions. That region of the reflection element 43 which freely spans the recess 47 is connected to that side of the piezoelectric element 39 which is opposite to the bottom of the recess 47.

If the dimensions of the piezoelectric element 39 change on account of a voltage applied by the measuring device 27, the flexible reflection element 43 is drawn to a greater or lesser extent into the recess 47, as a result of which the curvature of the reflective surface 45 is altered. This also varies the focusing point of the laser light beam 5.

The reflection element 43 is designed in such a way that it moves back into an original position when the piezoelectric element 39 exerts no forces which effect elastic deformation of the reflection element.

Such a configuration of the reflection element 43 requires no restoring devices which move the reflection element 43 into a defined basic position.

Figure 3:
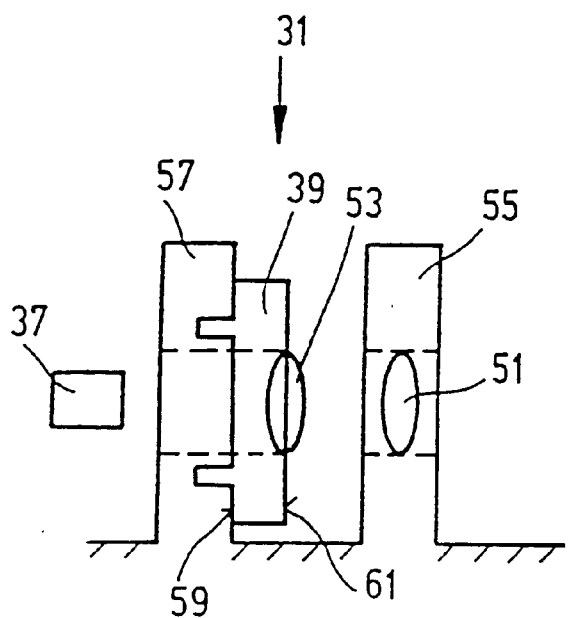
FIG. 3 shows a schematic sketch of a second embodiment of a focusing device of a scanner.

FIG. 3 shows a further exemplary embodiment of the focusing device 31, which has a lens system, in this case a stationary lens 51 and a movable lens 53. The stationary lens 51 is held by a suitable, stationary bearing 55. The movable lens 53 is connected to a piezoelectric element 39.

The element which carries the movable lens 53 is fixedly connected to a stationary bearing 57. In the exemplary embodiment illustrated here, the piezoelectric element 39 has an essentially rectangular construction in side view. It lies with its base surface 59 on the stationary bearing 57, while the movable lens 53 is fitted on its opposite boundary surface 61. If a control voltage is applied to the piezoelectric element 39 by the measuring device 27, the distance between the boundary surface 61 and the base surface 59 changes. As a result, the movable lens 53 arranged in the light path of the laser light source 37 is also displaced, in order to effect focusing.

In the region where the movable lens 53 is fixed, the piezoelectric element 39 has a perforation, through which the light emitted from the light emitted from the laser source 37 can pass onto the lens 53 and from there onto the lens 51 and finally to the bar code to be scanned.

The focusing method will be explained in more detail with reference to FIG. 4. The distance d between a receiving device which receives laser light and a bar code to be scanned is depicted against time t in FIG. 4. The maximum distance $d_{max}$ at which a bar code to be acquired by the scanner 1 can be is indicated by a dashed line. The reading range of the scanner is indicated by two dashed lines and a double arrow 63.

Up to the instant t, a surface is registered which is arranged at a distance from the scanner which is greater than $d_{max}$.

In the interval between $t_1$ and $t_2$, a first object is registered whose surface is situated at a distance from the scanner which is less than $d_{max}$.

In the interval between $t_2$ and $t_3$, no object is situated within the possible reading range of the scanner.

In the interval between $t_3$ and $t_4$, a second object is registered whose surface is appreciably nearer to the scanner than that of the object registered in the interval $t_1$ to $t_2$.

A third object is registered in the interval between $t_5$ and $t_6$. Finally, in the interval $t_7$ to $t_8$, a further object is registered which is arranged at a distinctly greater distance from the scanner than the one mentioned above.

In the interval up to $t_1$, the scanner is set to a maximum distance, so that the reading range is set up for the maximum distance $d_{max}$.

The hatched depth of field range in the interval up to $t_1$, within which range the scanner con register a surface of an object, thus directly adjoins the maximum reading distance $d_{max}$.

The surface of the object registered in the interval $t_1$ to $t_2$ lies outside this range. The measuring device 27 therefore passes a control signal to the piezoelectric element 39, with the result that the reading range is altered. The reading or depth of field range indicated by two parallel dotted lines is now set in such a way that the surface of the object registered in the interval $t_1$ to $t_2$ lies within this range.

The reading range is not altered after the instant $t_2$, since here the scanner is situated over a surface at a distance which lies outside its maximum reading range.

The surface, registered in the interval $t_3$ to $t_4$, of the next object lies within the maximum distance of the scanner, but outside the reading range given previously.

In response, the focusing device 31 is driven in such a way that the reading range is altered and the surface registered in the interval $t_3$ to $t_4$ can be scanned by the scanner and bar codes on this surface can be read.

In order to alter the reading range, a control signal is again applied to the piezoelectric element 39 and either the surface 45 of the reflection element 43 is altered or the position of the movable lens 53 is varied, until the scanner registers surfaces in the reading range desired here.

After the instant $t_4$, the scanner is again situated over a surface, for example the support for the objects to be scanned, which lies outside its maximum reading distance $d_{max}$. Therefore, since no surface lying within a reading range that can be set is registered, the focusing device 31 is not altered.

In the interval $t_5$ to $t_6$, a surface is registered which again lies in the reading or depth of field range set previously. The focusing device 31 is therefore not altered.

After the instant $t_6$, the situation once again arises where no surface situated within the reading range or within the maximum reading distance $d_{max}$ is registered. The focusing device 31 is therefore not altered.

Finally, in the interval $t_7$ to $t_8$, a surface is registered which, although it lies within the maximum reading distance $d_{max}$, in fact lies outside the reading range set previously. Therefore, the focusing device 31 is now controlled to produce a reading range within which the surface to be scanned is arranged.

Since the focusing device can react very rapidly on account of the low mass inertia of the piezoelectric element, the reading range is adjusted very quickly such that the surface to be scanned lies within this range almost without any delay. For example, the reading range is adjusted within a time $\Delta t_1$ such that the surface registered after the instant $t_1$ lies within the reading range. Since the maximum adjustment speed of the focusing system is limited, the time $\Delta t$ within which focusing is possible depends on the extent to which the surface to be scanned lies outside the current reading range.

In the reading and focusing method explained with reference to FIG. 4, it is possible to scan only one object in each case.

Figure 5:
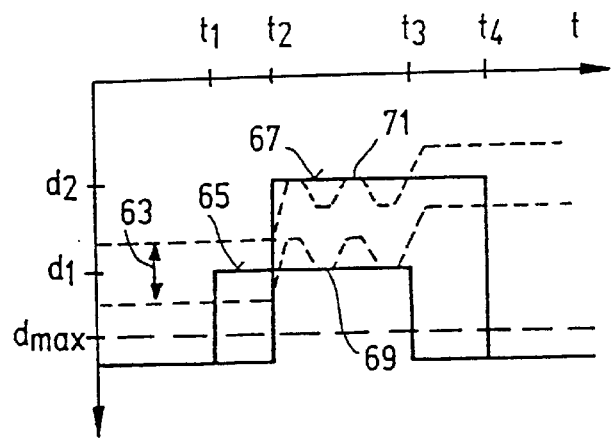
FIG. 5 shows a second diagram explaining the method of operation of the scanner.

With reference to FIG. 5, it will be explained how a plurality of objects are scanned simultaneously:

First of all, the distance of all the objects lying within the reading range of the scanner is registered and the minimum reading distance is determined therefrom. In the diagram portrayed in FIG. 5, two objects have been registered, the distance between the first object and the scanner having been indicated by $d_1$ and the distance between the second object and the scanner having been indicated by $d_2$.

The reading distance is determined for the two objects. If the difference between the distances $d_1$ and $d_2$ is smaller than the depth of field range of the scanner, the required reading distance is set to the mean value of the reading distances $d_1$ and $d_2$.

Should the difference between the two reading distances be larger than the depth of field range, the focusing device is activated in such a way that the surface of the one object and then the surface of the other object lie alternately within the reading range and can be scanned. Preferably, as can be seen in FIG. 5, the focusing device is set in such a way that the surfaces to be registered coincide with the extreme ranges of the reading range. This ensures that the focusing device has to effect only a minimum adjustment displacement.

FIG. 5 shows that the required reading distance (Required Scan Distance, RSD) when registering the surface of a single object is chosen such that the surface thereof lies approximately in the centre of the reading range. This is shown in FIG. 5 for the interval $t_1$ to $t_2$.

Figure 4:
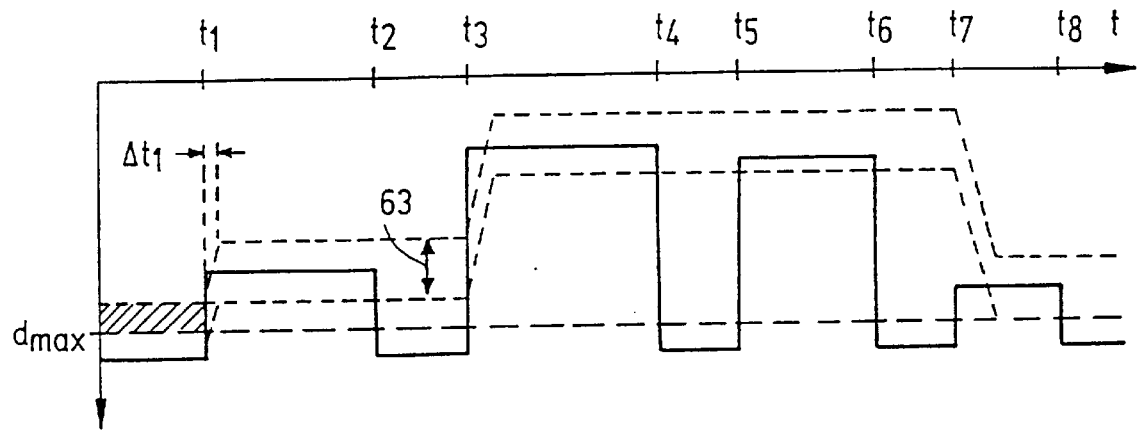
FIG. 4 shows a first diagram explaining the method of operation of the scanner.

If we take another look at FIG. 4 on this point, it can be seen that the reading range in the interval $t_1$ to $t_2$ is likewise set in such a way that the object surface to be scanned lies in the centre of the reading range. This setting is also produced for the object scanned in the interval $t_3$ to $t_4$: the surface of the object lies in the centre of the reading range. The surface of the next object, which is scanned in the interval $t_5$ to $t_6$, lies outside the centre of the reading range, because the focusing device is not activated. This is not necessary because the surface of the instantaneously registered object still lies within the reading range.

The object registered in the interval $t_7$ to $t_8$ requires a new setting of the reading range. In this case, it is again ensured that the surface to be scanned lies in the centre of the reading range.

It can be seen in FIG. 5 that after the instant $t_2$ up to the instant $t_3$ two objects lie within the acquisition range of the scanner, which range is limited by the value $d_{max}$ depicted by dashed lines. Since, during the time $t_2$ to $t_3$, the two surfaces 65 and 67 to be scanned of the objects no longer lie within the reading range which is indicated by the double arrow 63, existed in the interval from $t_1$ to $t_2$ and is delimited by dashed lines, the focusing device 31 is activated starting at the instant $t_2$, to be precise in such a way that the surface 65 of the first object, on the one hand, and the surface 67 of the second object, on the other hand, can be scanned. In the method illustrated in FIG. 5, the reading range is adjusted in such a way that sometimes the surface 65 of the first object coincides with the lower limit 69 of the reading range and sometimes the surface 67 of the second object coincides with the upper limit 71 of the reading range.

Once the instant $t_3$ is reached, the depth of field range is set in such a way that the surface 67 of the second object lies approximately in the centre of the reading range. Further activation of the focusing device is not required anymore, since only a single surface is arranged in the scanning range of the scanner.

It is thus possible, immediately after one or more objects have been registered, to set the scanner 1 to the distance from the object 13 and to ensure sharp imaging of the objects and of the bar code 15 provided thereon. On account of the high focusing speed of the focusing device 31, it suffices completely to provide the laser device 3 with a single laser light source 37. Additional laser light sources which can scan the objects 13 in different reading or distance ranges ore therefore unnecessary. The focusing device 31 sets the single laser light source 37 to the correct distance immediately after one or more objects have been registered, thereby enabling the bar code 15 to be acquired reliably and virtually without error.

The mechanical actuator 35 used in this case, then, is a piezoelectric element or a piezoelectric crystal or a piezoelectric crystal whose dimension change based on a control signal is used to ensure focusing of the reflected light 25 on the receiving device 23.

The mechanical actuator 35 is distinguished in all cases by the fact that it reacts very quickly to the control signal of the measuring device 27 and ensures; that the bar code 15 is imaged sharply on the receiving device 23. It is therefore possible, then, to dispense with further laser light sources. It is thus possible to register objects 13 in a distance range which is essentially larger than the reading range of a single laser light source.

What is claimed is:

1. Scanner for the acquisition of optical information, in particular bar codes, comprising:
    a laser device having a single laser light source emitting a single laser light beam;
    a deflection device upon which the single laser light beam impinges and whereby the single laser light beam is directed to a surface of an object carrying the optical information to be acquired;
    a focusing device, wherethrough the single laser light beam is guided after being emitted by the single laser light source and before impinging onto the deflection device, and whereby the single laser light beam is focused to the surface of the object carrying the optical information;
    a receiving device which detects light reflected from the surface of the object carrying the optical information, and
    a measuring device which registers the distance from the surface of the object carrying the optical information, and emits a control signal corresponding to the distance,
    wherein the focusing device receives the control signal of the measuring device and adapts the focusing of the single laser light beam to the distance from the object.

2. Scanner according to claim 1, wherein the focusing device includes a mechanical actuator.

3. Scanner according to claim 2, wherein the mechanical actuator comprises a piezoelectric element.

4. Scanner according to claim 3, wherein the focusing device comprises at least one lens which is mounted so as to be passed through by the single laser light beam and to be moved by means of the piezoelectric element.

5. Scanner according to claim 4, wherein the focusing device comprises a stationary bearing, wherein the piezoelectric element has a base surface mounted on the stationary bearing and a boundary surface opposite to and spaced from the base surface and carrying a movable lens.

6. Scanner according to claim 5, wherein the focusing device comprises a further stationary bearing and a stationary lens borne by the further stationary bearing.

7. Scanner according to claim 3, wherein the focusing device comprises a reflection element which has a flexible, reflective, curved surface, such surface having a variable radius of curvature, the reflecting element being mounted so that the curved surface is impinged onto by the single laser light beam and is flexed by means of the piezoelectric element.

8. Scanner according to claim 7, wherein:
    the focusing device comprises a stationary bearing;
    the reflection element has a back surface opposite to the reflective surface;
    the piezoelectric element has a first side fixedly connected to the bearing and a second side, opposite to and spaced from the first side, connected to the back surface of the reflection element.

9. Scanner according to claim 8, wherein
    the stationary bearing has a bearing surface around a recess,
    the piezoelectric element is housed in the recess with its first side fixedly connected to the bearing at the bottom of the recess,
    the back surface of the reflection element peripherally rests on the bearing surface and is centrally fixed to the second side of the piezoelectric element.

10. Method for focusing a laser light beam emitted by a scanner onto an object for the acquisition of optical information carried by the object, the laser light beam emitted by the scanner is focused within a focusing range around an average distance between a minimum distance and a maximum distance, comprising the steps of:
    setting a maximum distance limit ($d_{max}$) for the acquisition of the information;
    setting a standby condition, where the focusing is set to a standby range;
    when an object is detected at an actual distance within the maximum distance limit ($d_{max}$), setting the actual focusing range to have an average distance equal to the actual distance;
    keeping the actual focusing range as long as an object is detected at an actual distance either within the actual focusing range or outside the maximum distance limit ($d_{max}$);
    when an object is detected at an actual distance outside the actual focusing range and within the maximum distance limit ($d_{max}$), setting the actual focusing range to have an average distance equal to the actual distance.

11. Method according to claim 10, comprising:
    when two objects are detected at the same time at a first and at a second actual distance different than the first actual distance, verifying whether the difference between the first and the second actual distances are smaller than the focusing range,
    in the affirmative, adjusting the actual focusing range to have an average distance equal to the average of the first and the second actual distances,
    in the negative, continuously alternatively varying the actual focusing range between a close condition where the minimum distance is equal to the first actual distance and a remote condition where the maximum distance is equal to the second actual distance.

12. Method according to claim 10, wherein the standby range includes the maximum distance limit ($d_{max}$).

* * * * *